United States Patent
Endo et al.

(10) Patent No.: US 8,154,426 B2
(45) Date of Patent: Apr. 10, 2012

(54) PARKING ASSIST APPARATUS AND METHOD

(75) Inventors: Tomohiko Endo, Toyota (JP); Yasushi Makino, Mishima (JP); Yuichi Kubota, Okazaki (JP); Yukiko Kawabata, Toyota (JP); Takuya Itou, Kuwana (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 264 days.

(21) Appl. No.: 12/297,337

(22) PCT Filed: Feb. 28, 2007

(86) PCT No.: PCT/JP2007/053825
§ 371 (c)(1),
(2), (4) Date: Oct. 16, 2008

(87) PCT Pub. No.: WO2007/122863
PCT Pub. Date: Nov. 1, 2007

(65) Prior Publication Data
US 2009/0278709 A1  Nov. 12, 2009

(30) Foreign Application Priority Data
Apr. 25, 2006  (JP) .................. 2006-120976

(51) Int. Cl.
*B60Q 1/48* (2006.01)
*B60Q 1/00* (2006.01)
*H04N 7/18* (2006.01)
*B60G 17/018* (2006.01)
*A01B 69/00* (2006.01)

(52) U.S. Cl. .............. 340/932.2; 340/436; 348/148; 701/36; 701/41

(58) Field of Classification Search ............ 340/932.2, 340/436; 348/148; 701/36
See application file for complete search history.

(56) References Cited

U.S. PATENT DOCUMENTS

| 7,012,549 B2 | 3/2006 | Mizusawa et al. | |
|---|---|---|---|
| 2001/0026317 A1* | 10/2001 | Kakinami et al. | 348/148 |
| 2002/0128750 A1 | 9/2002 | Kakinami et al. | |
| 2002/0175832 A1* | 11/2002 | Mizusawa et al. | 340/932.2 |

(Continued)

FOREIGN PATENT DOCUMENTS

DE  10 2005 015396  12/2005

(Continued)

OTHER PUBLICATIONS

Extended European Search Report dated Apr. 26, 2010 for EP Appl. No. 07737544.2.

(Continued)

*Primary Examiner* — George Bugg
*Assistant Examiner* — Jack Wang
(74) *Attorney, Agent, or Firm* — Finnegan, Henderson, Farabow, Garrett & Dunner, LLP

(57) ABSTRACT

The present invention is aimed at setting an efficient target track of a vehicle and thus improving convenience of the parking assist. According to the present invention, a parking assisting apparatus for assisting parking a vehicle is provided. The parking assisting apparatus comprises detecting means for detecting a positional relationship between an obstacle near the vehicle and a parking section line painted on the ground. The parking assisting apparatus is configured to vary a target track of the vehicle toward a target parking position based on the detected positional relationship between the obstacle and the parking section line.

7 Claims, 14 Drawing Sheets

U.S. PATENT DOCUMENTS

| | | |
|---|---|---|
| 2003/0030724 A1 | 2/2003 | Okamoto |
| 2004/0260439 A1* | 12/2004 | Endo et al. ............... 701/36 |
| 2006/0136109 A1* | 6/2006 | Tanaka et al. ............ 701/41 |
| 2008/0174452 A1* | 7/2008 | Yamamoto et al. ...... 340/932.2 |

FOREIGN PATENT DOCUMENTS

| | | |
|---|---|---|
| EP | 1 253 065 | 10/2002 |
| EP | 1 332 948 | 8/2003 |
| EP | 1 642 808 | 4/2006 |
| JP | 10-114274 | 5/1998 |
| JP | 2000-72018 | 3/2000 |
| JP | 2003-11762 | 1/2003 |
| JP | 2003-54341 | 2/2003 |
| JP | 2003-81042 | 3/2003 |
| JP | 2004-34946 | 2/2004 |
| JP | 2005-35498 | 2/2005 |
| JP | 2006-96312 | 4/2006 |
| JP | 2006-120976 | 5/2006 |

OTHER PUBLICATIONS

Office Acton from the Japanese Patent Office mailed Sep. 1, 2009 for JP 2006-120976.

Extended European Search Report in European Application No. 11 16 9869 dated Jul. 15, 2011.

* cited by examiner

PARKING ASSIST APPARATUS AND METHOD

CROSS-REFERENCE TO RELATED APPLICATIONS

This application is a national phase application of International Application No. PCT/JP2007/053825, filed Feb. 28, 2007, and claims the priority of Japanese Application No. 2006-120976, filed Apr. 25, 2006, the contents of both of which are incorporated herein by reference.

TECHNICAL FIELD

The present invention relates to a parking assisting apparatus and method for assisting parking a vehicle.

BACKGROUND ART

JP2003-54341 A discloses a parking assisting apparatus comprising obstacle detecting means for detecting an obstacle near the vehicle; a vehicle motion calculating section configured to calculate the vehicle position and vehicle orientation in a two-dimensional plane based on steering angle and vehicle speed; and a target parking position determining section configured to detect a parking space based on the vehicle motion calculated by the vehicle motion calculating section and the relative positional relationship with respect to the detected obstacle and determine the target parking position.

By the way, a situation where the parking assist for the target parking position is impossible with such a type of parking assisting apparatus includes a situation where it is impossible to create a target track of the vehicle toward the target parking position from the current vehicle position (including a parking start position). If falling into such a situation, the parking assisting apparatus forces the driver to change the parking start position or the target parking position (or reset the parking process if the driver has started to move the vehicle for parking), bringing inconvenience to the driver. For this reason, it is of importance to make it difficult for the parking assisting apparatus to fall into such a situation, in terms of improving convenience of the parking assist.

One of the solutions to this problem includes a configuration in which the parking start position is set farther with respect to the target parking position enough to obtain a sufficient margin, and the vehicle is guided to the parking start position in a pre-parking stage. According to this configuration, since it becomes possible to calculate the target track of the vehicle toward the target parking position with a large margin, the situation where it becomes impossible to create the target track is not likely to occur even when the target parking position is subsequently changed to some extent.

However, in this configuration, since the parking start position has to be inefficiently set under a rigid constraint and the parking start position set in this way may largely depart from the ordinary parking start position in the case of not utilizing the parking assist, the improvement in convenience of the parking assist may be impaired.

DISCLOSURE OF INVENTION

Therefore, it is an object of the present invention to provide a parking assisting apparatus and method which can set an efficient target track of the vehicle and thus improve convenience of the parking assist.

In order to achieve the aforementioned objects, according to the first aspect of the present invention, a parking assisting apparatus for assisting parking a vehicle in a target parking position is provided which comprises;

detecting means for detecting a positional relationship between an obstacle near the vehicle and a parking section line painted on the ground;

wherein said apparatus is configured to change a target track toward the target parking position based on the detected positional relationship between the obstacle and the parking section line. With this arrangement, it becomes possible to create an appropriate target track in accordance with the detected positional relationship between the obstacle and the parking section line.

According to the second aspect of the present invention, in the first aspect of the present invention, the target track is changed in its turning radius and its length of a straight line section after a turning section. With this arrangement, it becomes possible to create an efficient target track.

According to the third aspect of the present invention, in the first aspect of the present invention, said apparatus is configured to calculate the target track of the vehicle toward the target parking position based on positional information of the obstacle which is located on a turn center side if the parking section line is not detected.

According to the fourth aspect of the present invention, in the first or the second aspect of the present invention, if a parking space is detected between two obstacles and the parking section line is not detected, said apparatus is configured to calculate the target track of the vehicle toward the target parking position based on positional information of the obstacle which juts out more than the other obstacle on an inlet side of the parking space. With this arrangement, it becomes possible to create an efficient target track in accordance with the situation of the obstacles.

According to the fifth aspect of the present invention, a parking assisting apparatus for assisting parking a vehicle in a target parking position is provided which comprises;

obstacle detecting means for detecting an obstacle near the vehicle;

wherein if a parking space is detected between two obstacles, said apparatus is configured to vary a target track of the vehicle toward a target parking position based on a positional relationship between the two obstacles in a parking direction. With this arrangement, it becomes possible to create an efficient target track in accordance with the situation of the obstacles, even under a condition where the parking section line is not detected.

According to the sixth aspect of the present invention, in the fifth aspect of the present invention, in a situation where the obstacle located not on a turn center side juts out more than the other obstacle on an inlet side of the parking space, the target track is calculated such that the turning radius in the case of the amount of jutting being larger is larger than that in the case of the amount of jutting being smaller and/or the length of the straight line portion section after the turning section in the case of the amount of jutting being larger is smaller than that in the case of the amount of jutting being smaller. With this arrangement, since it becomes possible to create an efficient target track with a higher degree of freedom, the parking start position can be set under less constraint, and thus have less difference with respect to the parking start position in the case of not utilizing the parking assist.

According to the seventh aspect of the present invention, a parking assisting method of assisting parking a vehicle comprises;

a step of determining a target parking position; and a step of calculating a target track of the vehicle toward the determined target parking position based on a positional relationship between an obstacle near the vehicle and a parking section line painted on the ground. With this arrangement, it becomes possible to create an appropriate target track in accordance with the positional relationship between the obstacle and the parking section line.

According to the present invention, it is possible to obtain a parking assisting apparatus and method which can set an efficient target track of the vehicle and thus improve convenience of the parking assist.

BRIEF DESCRIPTION OF THE DRAWINGS

These and other objects, features, and advantages of the present invention will become more apparent from the following detailed description of preferred embodiments given with reference to the accompanying drawings, in which.

Figure 1:
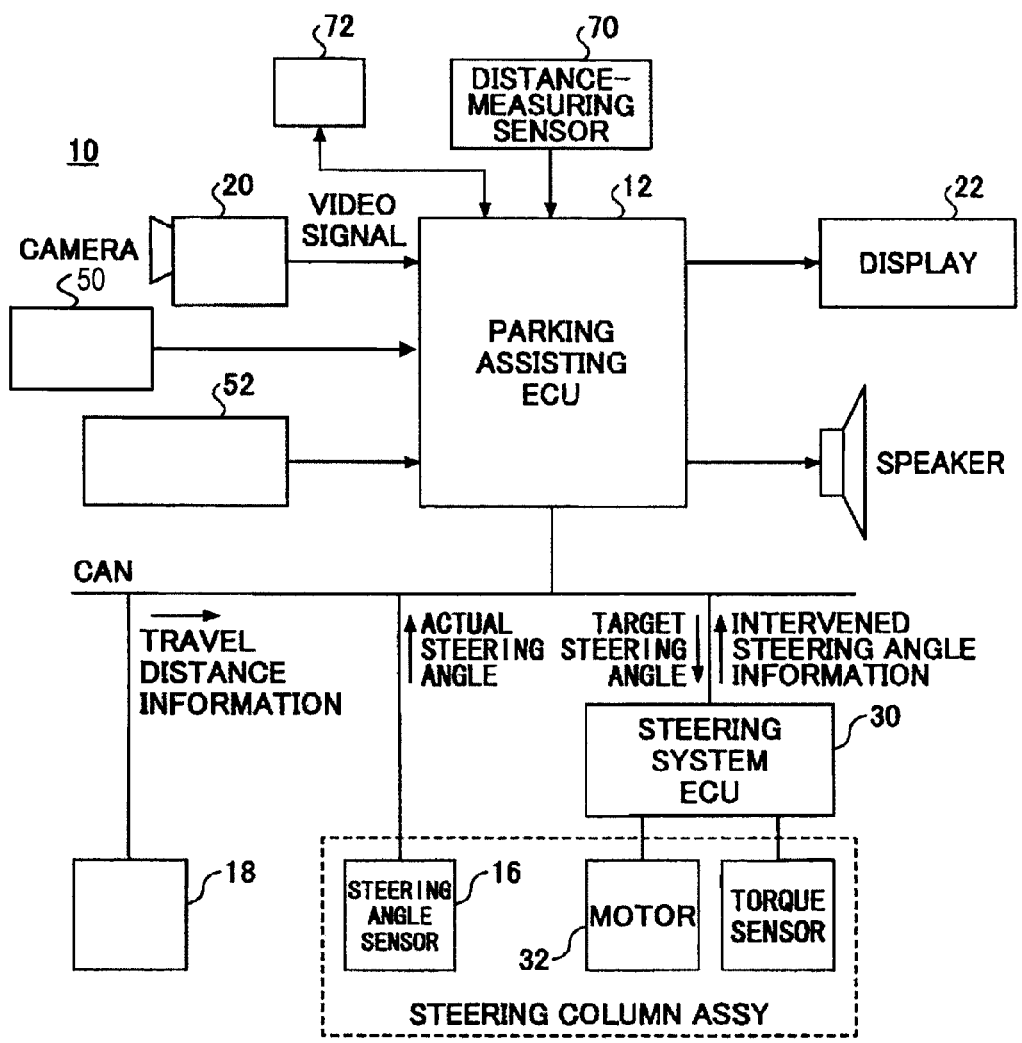
FIG. 1 is a system diagram of an embodiment of a parking assisting apparatus 10 according to the present invention.

EXPLANATION FOR REFERENCE NUMBER 10 parking assisting apparatus
12 parking assisting ECU
16 steering angle sensor
18 vehicle speed sensor
20 back monitoring camera
22 display
30 steering system ECU
42 obstacle information generating section
44 parking section line information generating section
46 target parking position calculating section
48 target track calculating section
50 reverse shift switch
52 parking switch
70 distance-measuring sensor
72 memory

BEST MODE FOR CARRYING OUT THE INVENTION

In the following, the best mode for carrying out the present invention will be described in detail by referring to the accompanying drawings.

FIG. 1 is a system diagram of an embodiment of a parking assisting apparatus 10 according to the present invention. As shown in FIG. 1, the parking assisting apparatus 10 is comprised mainly of an electronic control unit 12 (hereafter referred to as a parking assisting ECU 12). The parking assisting ECU 12 is comprised mainly of a microprocessor that includes a CPU, a ROM, a RAM, etc., (not shown) which are interconnected via appropriate buses. In the ROM are stored the computer readable programs to be carried out by the CPU and data.

The parking assisting ECU 12 is connected to a steering angle sensor 16 for detecting the steering angle of the steering wheel (not shown), and a vehicle speed sensor 18 for detecting the speed of the vehicle, via appropriate buses such as a CAN (Controller Area Network) or a high-speed communication bus. The vehicle speed sensor 18 may be wheel speed sensors provided on individual wheels, each of which generates pulse signals according to the rotating speed of the corresponding wheel.

The parking assisting ECU 12 is connected to a back monitoring camera 20, as shown in FIG. 1. The back monitoring camera 20 is mounted on the backside of the vehicle such that it images a scene behind the vehicle with a predetermined viewing angle. The back monitoring camera 20 may be a camera having image sensors, such as charge coupled devices and complementary metal-oxide semiconductor devices.

The parking assisting ECU 12 is also connected to a reverse shift switch 50 and a parking switch 52. The reverse shift switch 50 outputs an ON signal when a shift lever is shifted to the reverse position and otherwise outputs an OFF signal. The parking switch 52 is provided in the cabin of the vehicle so as to allow a user in the cabin to operate it. The parking switch 52 outputs an OFF signal in its normal state and outputs an ON signal when operated by the user.

The parking assisting ECU 12 determines whether the user needs assistance in parking the vehicle based on the output signal of the parking switch 52. The parking assisting ECU 12 starts parking assist control for assisting the vehicle's travel to a target parking position in the parking space, as soon as the parking switch 52 is turned on during the travel of the vehicle. The parking assist control includes not only vehicle control in the course of travel to the target parking position, such as steering control, but also information output to the driver such as a guide message for guiding the vehicle to the parking start position.

The parking assisting ECU 12 is connected to a distance-measuring sensor 70 which measures the distance with respect to an obstacle using sound waves (for example, sonic waves), radio waves (for example, millimeter waves), light waves (for example, lasers), etc. The distance-measuring sensor 70 may be any means which can detect a distance such as a stereo vision camera, other than laser radar, millimeter wave radar, and sonic wave sonar, for example. The distance-measuring sensor 70 is provided on either side of the front body of the vehicle.

Figure 2:
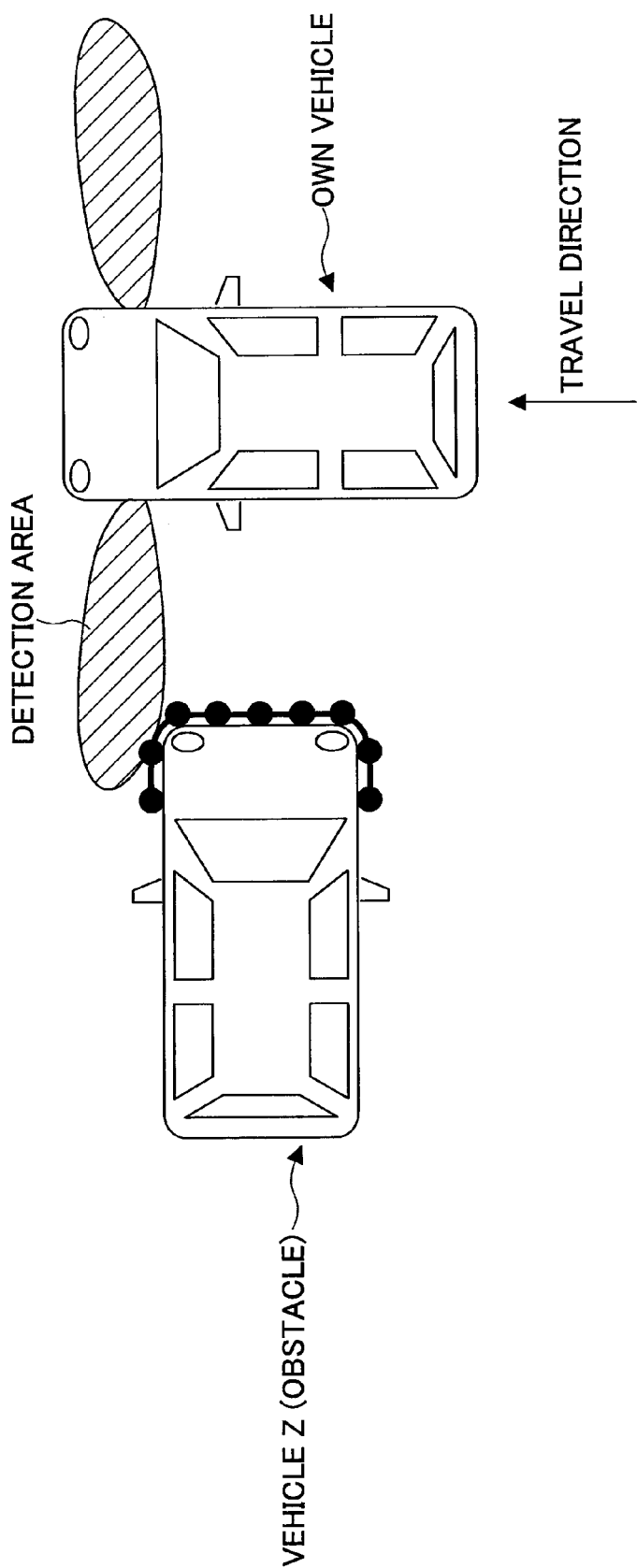
FIG. 2 is a diagram for illustrating how the distance-measuring sensor 70 detects the distance with respect to the object to be detected.

The distance-measuring sensor 70 detects the distance with respect to the obstacle located on the side of the vehicle by emitting sound waves or the like in a predetermined area, and then receiving the reflected waves, as shown in FIG. 2. The distance-measuring sensor 70 may be disposed near a bumper of the front body of the vehicle and may emit sound waves or the like in a slanting forward direction which forms an angle ranging from 17 degrees to 20 degrees with respect to the lateral direction of the vehicle, for example.

Figure 3:
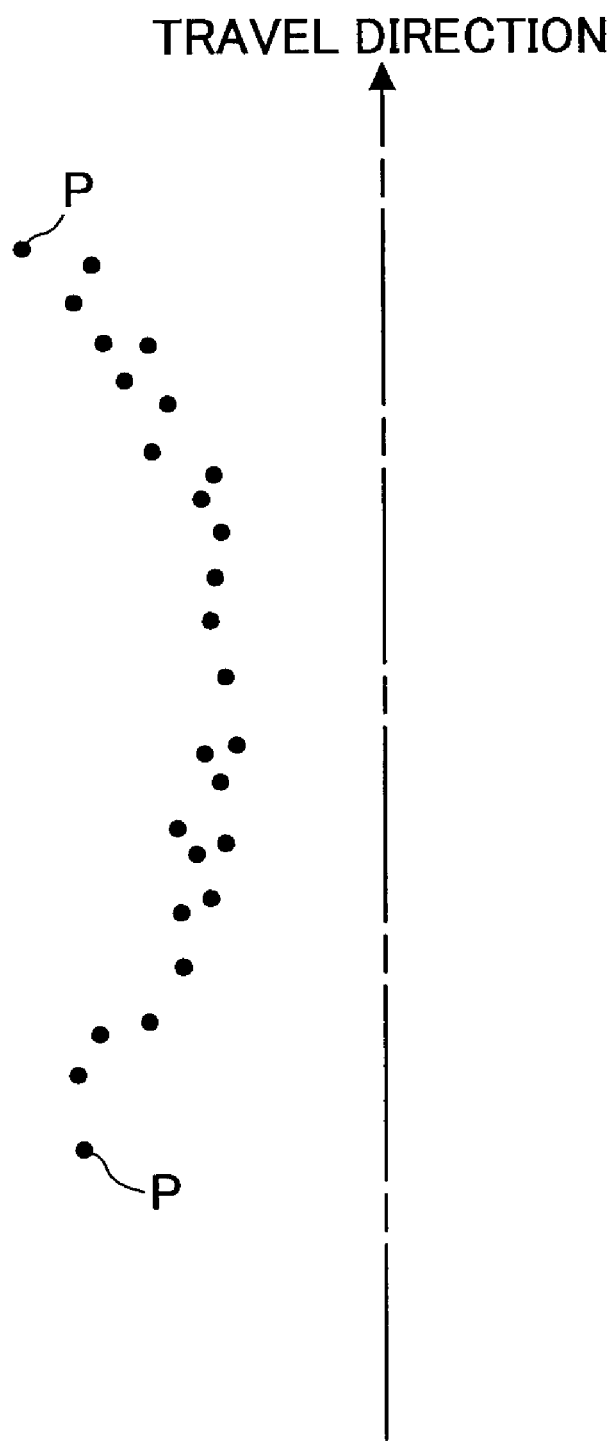
FIG. 3 is a diagram for illustrating the row of points related to the vehicle Z which can be obtained when the vehicle (own vehicle) with the distance-measuring sensor 70 runs near the vehicle Z in FIG. 2.

FIG. 3 is a diagram for illustrating the row of points related to the obstacle (vehicle Z) which can be obtained when the vehicle (own vehicle) with the distance-measuring sensor 70 runs near the vehicle Z in FIG. 2. The distance-measuring sensor 70 may output a row of points (i.e., a group comprised of reflected points of the sound wave) representing reflections from portions of the obstacle, as shown in FIG. 3. The output data may be stored periodically in a memory 72 (for example, EEPROM).

Figure 4:
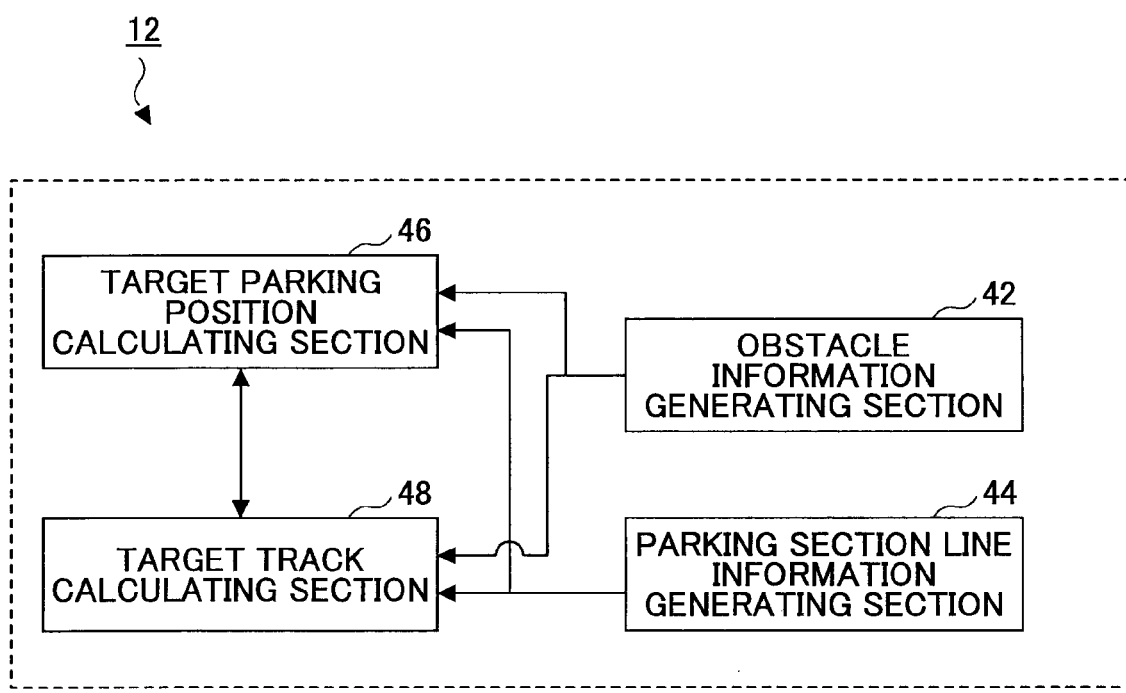
FIG. 4 is a functional diagram for illustrating main functions of the parking assisting ECU 12 according to the present embodiment.

FIG. 4 is a functional diagram for illustrating main functions of the parking assisting ECU 12 according to the present embodiment. The parking assisting ECU 12 includes an obstacle information generating section 42, a parking section line information generating section 44, a target parking position calculating section 46, and a target track calculating section 48. In the following, the configurations and functions of the respective sections will be described.

The obstacle information generating section 42 generates obstacle information as to the obstacle (s) next to the parking space. In the case of parallel parking, when the row of points whose length is greater than a predetermined length (>1 m) is detected and then the length of a section in which there is no row of points becomes greater than or equal to a predetermined length L1, a parking space is detected on the back side of the obstacle related to the row of points of the predetermined length. The predetermined length L1 corresponds to a minimum opening width which is necessary as a parking space for parallel parking. The predetermined length L1 is a value which should be defined depending on the width of the own vehicle. It is noted that the predetermined length L1 is 2.5 m in this example.

The obstacle information generating section 42 generates information as to the position of the edge portion of the obstacle(s), based on the data of the row of points which represents the edge portion of the obstacle neighboring the parking space. In this case, the obstacle information generating section 42 regards a point P (see FIG. 3) located at the end among the row of points related to the obstacle in a referential direction as an edge point of the obstacle and generates the information representing the position of the edge point. It is noted that the referential direction may be parallel to a nominal parking direction in the case of parallel parking and be perpendicular to a nominal parking direction in the case of tandem parking.

Figure 5:
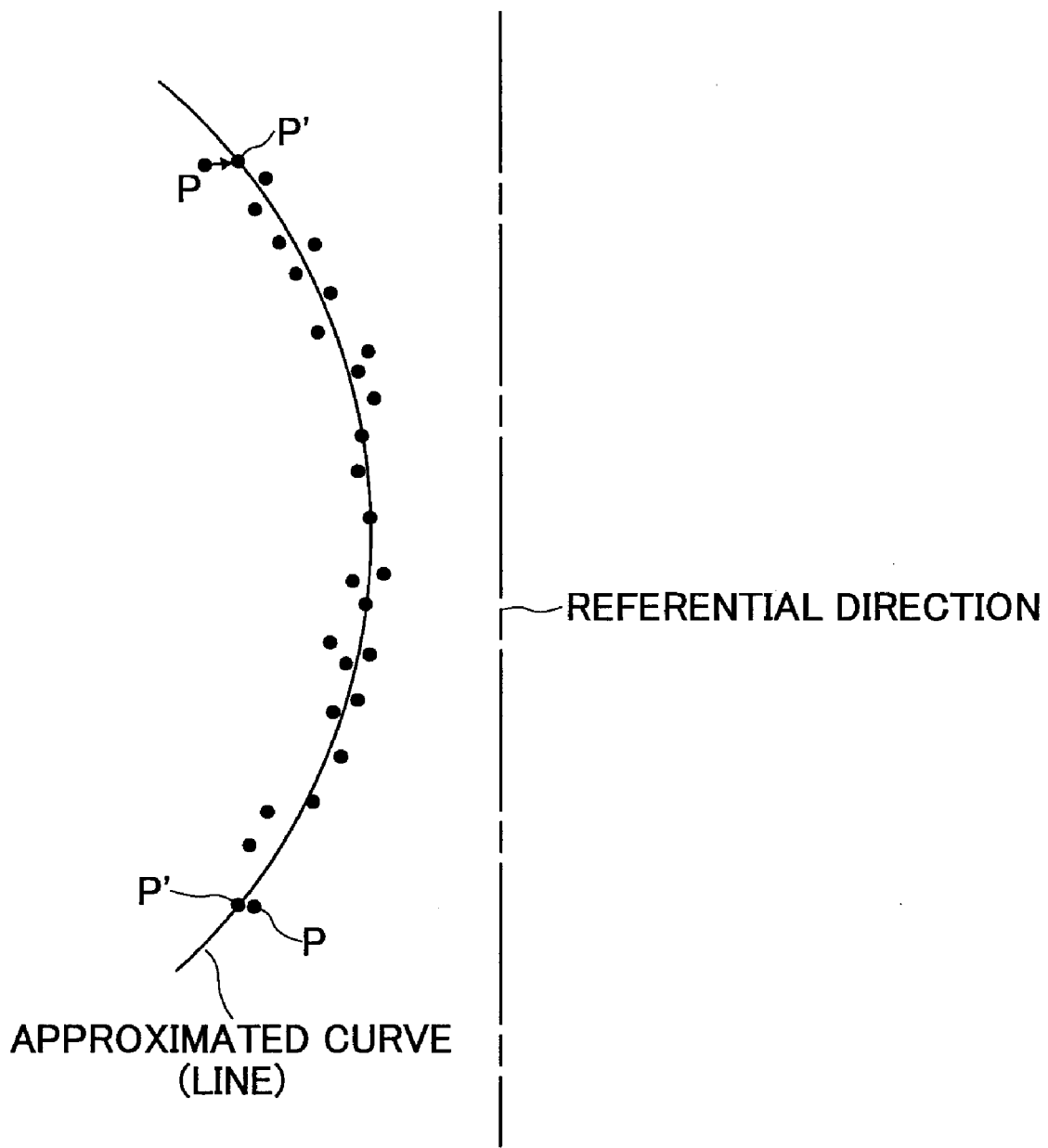
FIG. 5 is a diagram for illustrating an example of a way of correcting the edge point.

Alternatively, the obstacle information generating section 42 may generate more accurate obstacle information by applying liner approximation or approximation of functions to the entire row of points or the row of points greater than the predetermined length related to the detected obstacle. Generally, the front edge of the vehicle can be approximated to be a second-order function and the side edge of the vehicle can be approximated to be a line or a second-order function with small curvature. For this reason, the approximation with a second-order function or the approximation with a line may be carried out selectively, or both of the approximations may be carried out. For example, the obstacle information generating section 42 transfers the point P located at the end in the referential direction, among the row of points used for the approximation, to a point P' on the approximated curve or line (i.e., projects the edge point P on the approximated curve in a direction perpendicular to the referential direction) and then regards the point P' as an edge point of the obstacle to generate the positional information of the edge point of the obstacle, as shown in FIG. 5. It is noted that although in the aforementioned embodiment, the point located at the end in the referential direction is simply used as an edge point of the obstacle, the edge point of the obstacle may be the point located at the end along the side of the vehicle, or the edge point of the obstacle may be the point located nearest with respect to the target track among the row of points, in the case where the obstacle is a vehicle.

The obstacle information generating section 42 may generate the obstacle information based on the output results of the distance-measuring sensor 70 in real time, or generate the obstacle information based on the output results of the distance-measuring sensor 70 read from the memory 72 when the target parking position is determined. Further, if the parking space is detected between two obstacles, the obstacle information generating section 42 generates the obstacle information for each of the obstacles.

The parking section line information generating section 44 processes the image captured by the back monitoring camera 20 to recognize the parking section line and generates parking section line information. This process for recognizing the parking section line can be implemented variously, so any appropriate way may be utilized. Here, an example of the process for recognizing the parking section line is described. In this example, feature points are extracted in the ROI. The feature points are extracted as points at which the rate of change of luminance exceeds a predetermined value. In other word, edges (i.e., outlines) which are defined by steep change in brightness are extracted. Then, coordinates of the respective pixels are converted from the local coordinate system of the camera to the real coordinate system by distortion correction. Then, liner approximation is applied to the edges (i.e., row of pixels of the feature points) to derive the outlines of the feature points. Then, a pair of the parallel outlines is detected as longitudinal lines PLz (see FIG. 8) of the parking section line, which is typically a white paint line. Further, the outline connected to the end of the pair of the parallel outlines and perpendicular to the pair of the parallel outlines is detected as a transverse line PLx (see FIG. 8) of the parking section line.

The parking section line information generating section 44 generates the parking section line information which represents the positions of the parking section line detected in such a way. The positions of the parking section line may include the positions (i.e., two positions) of the front end points (i.e., the end points on an inlet side of the parking space) of the longitudinal lines PLz of the parking section line. Typically, the parking section line information generating section 44 generates the parking section line information when the vehicle is in the parking start position in which the parking section line is captured by the back monitoring camera 20. However, if the vehicle is equipped with a side monitoring camera or the like which images the scene on the side of the vehicle, the parking section line information generating section 44 may the parking section line information when the parking space is detected or in the course of traveling to the parking start position. The parking section line information generating section 44 may generate the parking section line information based on the images of the side monitoring camera in real time, or may generate the parking section line information based on the image output results (or image recognition results for parking section line) of the side monitoring camera read from the memory 72 when the target parking position is determined.

The target parking position calculating section 46 determines a target parking position as appropriate. The target parking position may be defined by the position of the center of the rear axle of the vehicle when the parking is completed. This process for determining the target parking position can be implemented variously, so any appropriate way may be utilized.

The target parking position calculating section 46 may determine the target parking position based on the output results of the distance-measuring sensor 70, for example. In this case, the target parking position calculating section 46 may determine a position, which is located in a predetermined relationship with respect to the edge position (i.e., edge point) of the obstacle(s) located on a turn center side, as the target parking position, for example. At this time, the angular relationship between the target parking position and the edge position of the obstacle(s) may be determined based on an orientation of the vehicle, an (approximated) shape of the obstacle(s), a line connecting the edge points of two obstacles, etc. Further, if the parking space is detected between two obstacles (i.e., if there is a section in which no row of points exists more than a predetermined length between the edge points of the rows of points representing two obstacles, for example), the midpoint between the respective edge points of two obstacles may be determined as the target parking position. At this time, the angular relationship between the target parking position and the edge position of the obstacle(s) may be determined based on an orientation of the vehicle, an (approximated) shape of the obstacle(s), a line connecting the edge points of two obstacles, etc. According to the above-mentioned way of determining the target parking position using the output results of the distance-measuring sensor 70, it is possible to determine the target parking position in a earlier stage (i.e., in a stage where the parking space is detected) and thus perform the parking assist, such as guiding to the parking start position, for example, based on the determined target parking position.

The target parking position calculating section 46 may determine the target parking position based on the recognition results of a parking section line in images captured by the back monitoring camera 20 (or the side monitoring camera), for example. In this case, the target parking position calculating section 46 may determine a position, which is located in a predetermined relationship with respect to the edge position (i.e., edge point) of the longitudinal line of the parking section line located on a turn center side, as the target parking position, for example. At this time, the angular relationship between the target parking position and the edge position of the longitudinal line may be determined based on the direction of the parking section line. Alternatively, the target parking position may be determined based on the recognition results of obstacle(s) in images. With this determining way, the target parking position may be determined when the vehicle reaches near the parking start position (typically, when the vehicle stops at the parking start position) in the case of using the back monitoring camera 20.

The target parking position calculating section 46 may determine a position which is located in a predetermined relationship with the temporary stop position of the vehicle as the target parking position, if it is determined that the vehicle temporarily stops within the travel distance of 6.5 m before the parking start position, for example. Alternatively, the target parking position calculating section 46 may determine a position which is located in a predetermined relationship with the position of the vehicle when the user pushes a predetermined button as the target parking position. Alternatively, the target parking position calculating section 46 may determine the target parking position based on the traveling pattern of the vehicle (i.e., history of changes in position and orientation of the vehicle). According to the above-mentioned ways of determining the target parking position, it is possible to determine the target parking position in a earlier stage (i.e., in a stage where the parking space is detected) and thus perform the parking assist, such as guiding the vehicle to the parking start position, for example, based on the determined target parking position.

Figure 6:
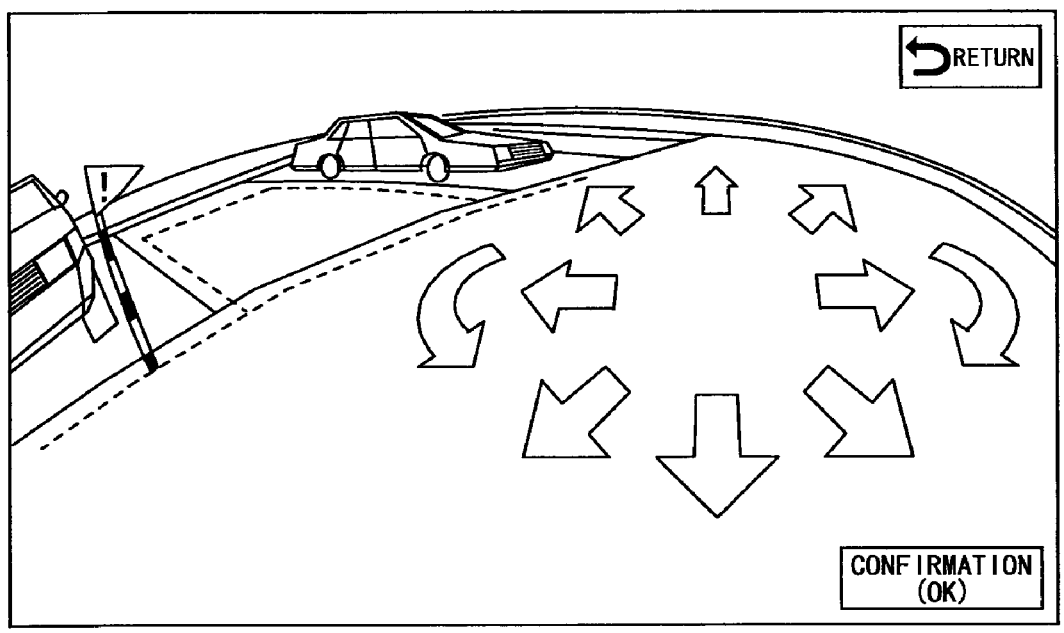
FIG. 6 is an image of an example of a touch switch panel for setting a target-parking position on the display 22.

The target parking position calculating section 46 may determine the target parking position based on the initial position and direction of a target parking frame (see FIG. 6) displayed on the display 22. In the screen in FIG. 6, the target parking frame is displayed on the display 22 when the reverse shift switch 50 is turned on in the parking start position, for example. The target parking frame may be a pictorial display which imitates an actual parking frame or an outside shape of the vehicle. For example, the target parking frame may have a form whose position and direction users can recognize. Two types of target parking frames may be prepared for parallel parking and tandem parking, respectively. The position and direction of the target parking frame may be adjusted with touch switches, etc., for moving the target parking frame in lateral and longitudinal directions and in directions of rotation, as shown in FIG. 6, before operating the confirmation switch. In this case, the target parking position calculating section 46 may determine the target parking position in accordance with the position and direction of the target parking frame, using a predetermined transformation between the local coordinate system of the display 22 (i.e., the coordinate system of the image) and the real coordinate system. It is noted that with this way of determining the target parking position, the target parking position is determined in response to the setting of the user after the vehicle has stopped at the parking start position.

The target track calculating section 48 calculates the target track for guiding the vehicle to the target parking position determined in the aforementioned manner.

Figure 7:
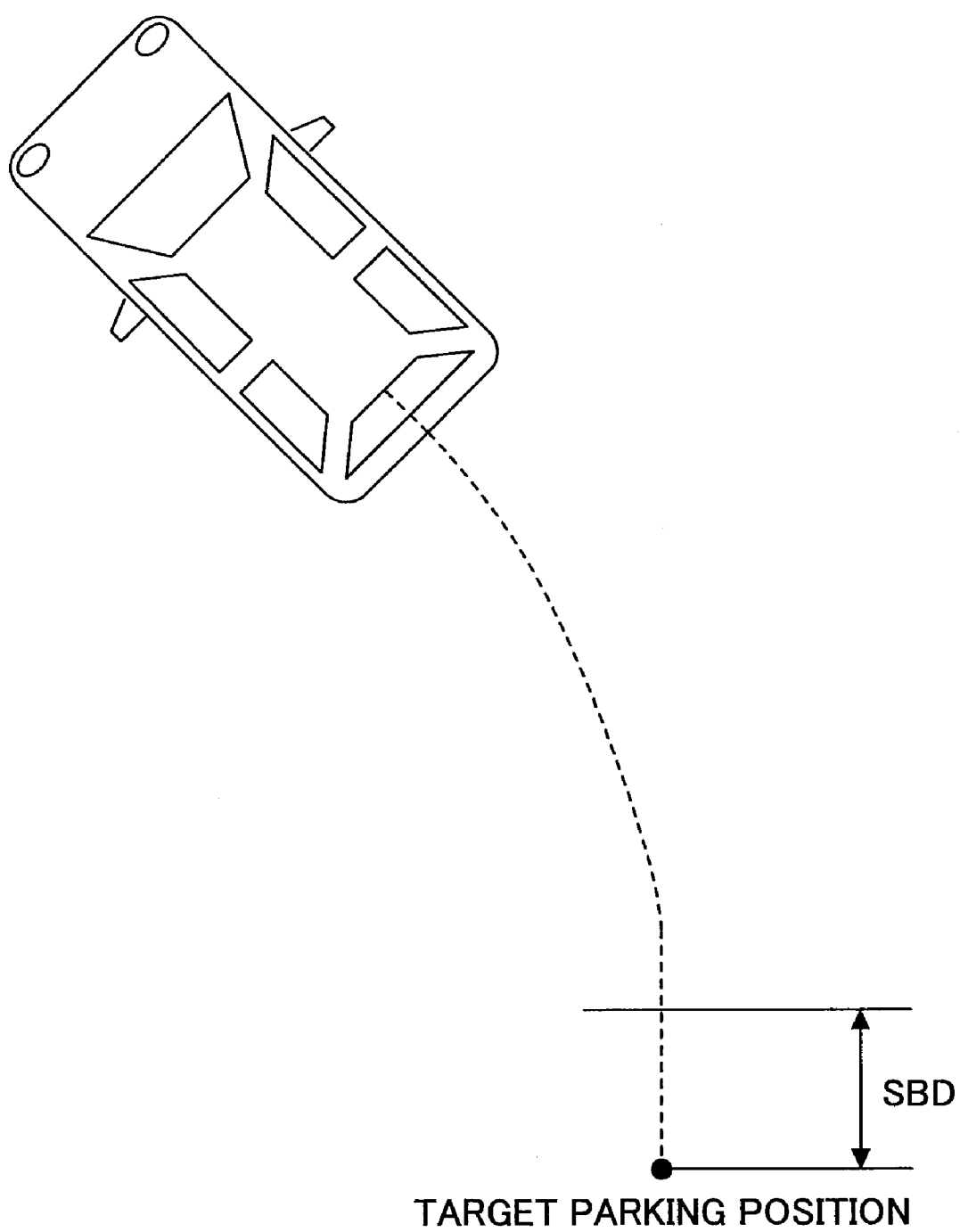
FIG. 7 is a plan view of the general target track used in the case of parallel parking.

FIG. 7 is a plan view of the general target track used in the case of parallel parking. The target track toward the target parking position is determined mainly based on the positional information of the target parking position, the edge position information of the obstacle(s), the cornering characteristics of the vehicle, etc. The target track is defined by a combination of a circle track, a clothoid track, a straight line track, etc.

In this embodiment, a section of the target track just before the target parking position is comprised of a straight line track. In other words, the target track, along which the vehicle reaches the target parking position finally in a straight-ahead status after turning, is calculated. In the following, the length of the straight line track after the turning track is referred to as a final straight line length SBD.

In determining the target track, the final straight line length SBD is determined first, and then the turning track of a circle or clothoid, which connects to the point which is located on the final straight line length SBD back from the target parking position, is determined.

Here, the final straight line length SBD is necessary to avoid the interference with respect to the obstacle located on the turn center side. If the final straight line length SBD is made smaller, the curvature radius of the turning track of the target track can be greater accordingly, which improves the steering efficiency and enables enlarging the range of the parking start position from which the target track can be created (for example, bring the parking start position, from which the target track can be created, nearer to the target parking position). On the other hand, as the final straight line length SBD is made smaller, a turning track (i.e., a circle or clothoid track) shifts more toward the target parking position, which increases the likelihood of interference between the vehicle on the turning track and the obstacle located on the turn center side. Therefore, the final straight line length SBD is set optimally considering these mutually contradictory matters.

The target track calculating section 48 according to this embodiment varies the way of calculating the target track in accordance with image recognition results of the parking section line and detection results of the obstacle(s) near the parking space. In the following, the ways of calculating the target track selectively used in accordance with various situations are described.

Figure 8:
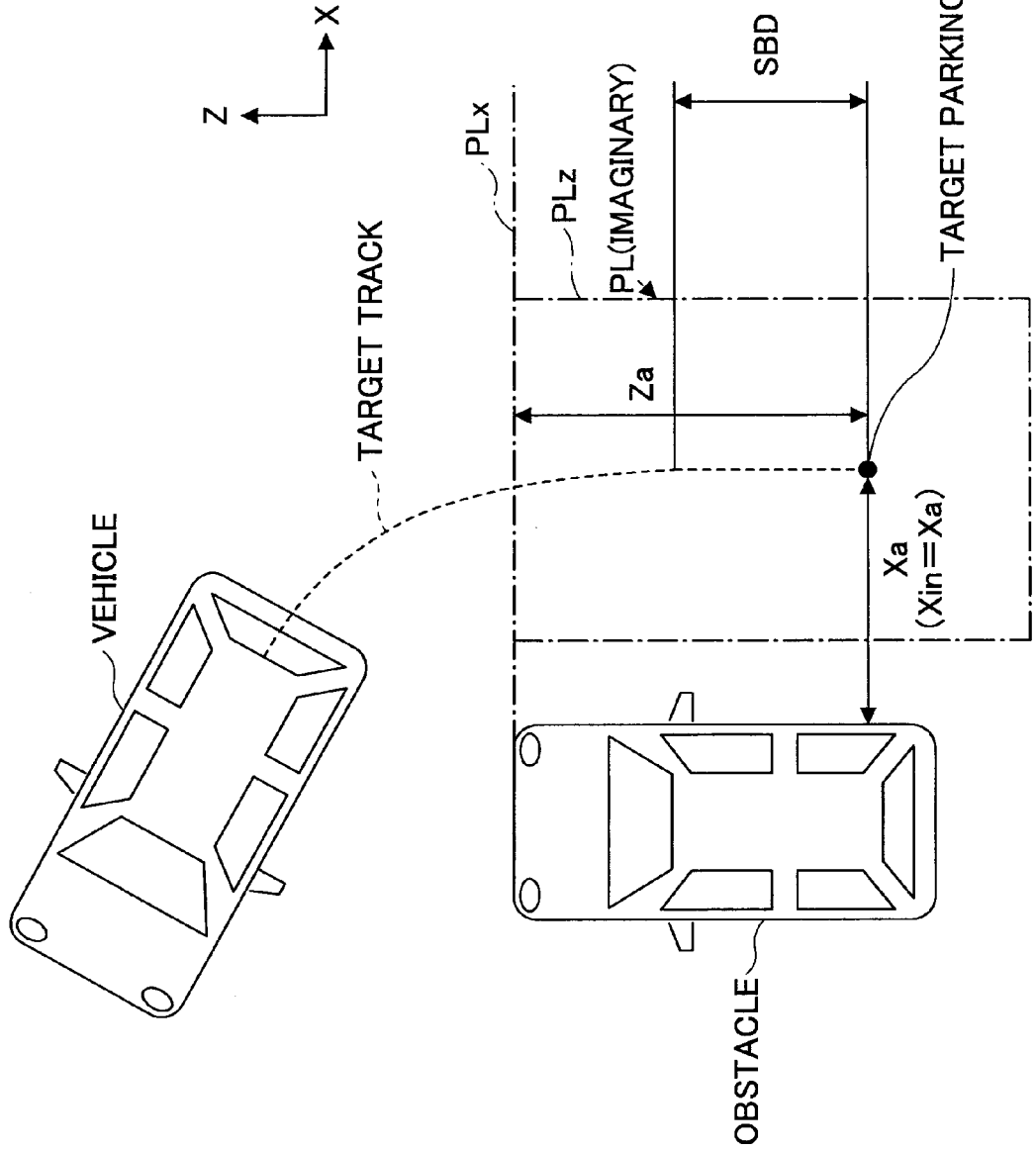
FIG. 8 is a plan view for illustrating the way of calculating the target track under the condition where there is an obstacle on a turn center side and the parking section line is not detected by means of image recognition.

FIG. 8 is a plan view for illustrating a situation where there is an obstacle on a turn center side and the parking section line is not detected by means of image recognition. In the following, for convenience of the explanation, a direction parallel to the nominal parking direction is referred to as the Z direction, and a direction perpendicular to the nominal parking direction is referred to as the X direction. The Z and X directions may be recognized or estimated by the system (i.e., parking assisting ECU 12) based on the direction of the recognized parking section line.

The situation in which there is an obstacle on a turn center side may be detected based on the output results of the distance-measuring sensor 70. Alternatively, the situation may be detected based on image recognition results of the obstacle(s) using the images captured by the back monitoring camera 20 or the side monitoring camera. In this case, the way of recognizing the obstacle may be any way. For example, a larger ROI may be set, and among the outlines of the feature points obtained from the result of the liner approximation, the outlines whose degree of parallelization or perpendicularity with respect to the parking section line is larger than a predetermined value are recognized as the outlines related to the obstacle.

The situation in which the parking section line in the image is not recognized may be the situation in which the parking section line cannot be recognized due to influence of insufficient light at night, underground parking area, etc. (i.e., influence on extraction of the edges), the positional relationship between the actual parking section line and the coverage of the back monitoring camera 20, snow cover, etc., the situation in which no parking section line exists in the first place, or the situation in which the back monitoring camera 20 or a function of recognizing the parking section line in the image is not available in the first place. Alternatively, the situation may include a situation in which the parking section line in the image is recognized but the parking section line is located backward (i.e., in the farther side) with respect to the position of the edge portion of the obstacle located on the turn center side. It is noted that although the parking section line PL is indicated by alternate long and short dashed lines in FIG. 8, this parking section line PL is an imaginary parking section line assumed by the system (i.e., parking assisting ECU 12).

Under the situation shown in FIG. 8, the target track calculating section 48 determines the target track, along which the vehicle can move without any contact with the edge portion of the obstacle located on the turn center side, based on the edge position information of the obstacle located on the turn center side. This way of creating the target track can be implemented variously, so any appropriate way may be utilized. For example, under the situation shown in FIG. 8, the target track may be derived uniquely from the target parking position. In this case, the target parking position is determined based on the edge position information of the obstacle located on the turn center side. The Z component of the target parking position is set to a position which is shifted from the edge portion of the obstacle by a predetermined distance Za (=(vehicle's overall length)−(rear overhang)), as shown in FIG. 8. The X component of the target parking position is set to a position which is shifted from the edge portion of the obstacle by a predetermined distance Xa, as shown in FIG. 8. The predetermined distance Xa may correspond to half the width of the vehicle plus a margin (0.3 m, for example). A predetermined final straight line length SBD and referential track may be used to determine the target track. In this case, the final straight line length SBD is the greatest of those under other situations described later, and may be about 1.3 m. This value of the final straight line length SBD (1.3 m, for example) may be used as an upper limit in determining the final straight line length SBD.

It is noted that the target track in the situation shown in FIG. 8 may be determined in the same way as the target track is determined in a configuration in which the target parking position is set by moving the target parking frame having a pole image which imitates the obstacle. This is because there is the same idea in such a configuration in which the pole located in a predetermined relationship with the target parking frame is regarded as an edge portion of the obstacle, and the target track is determined so as not to interfere with the pole.

Figure 9:
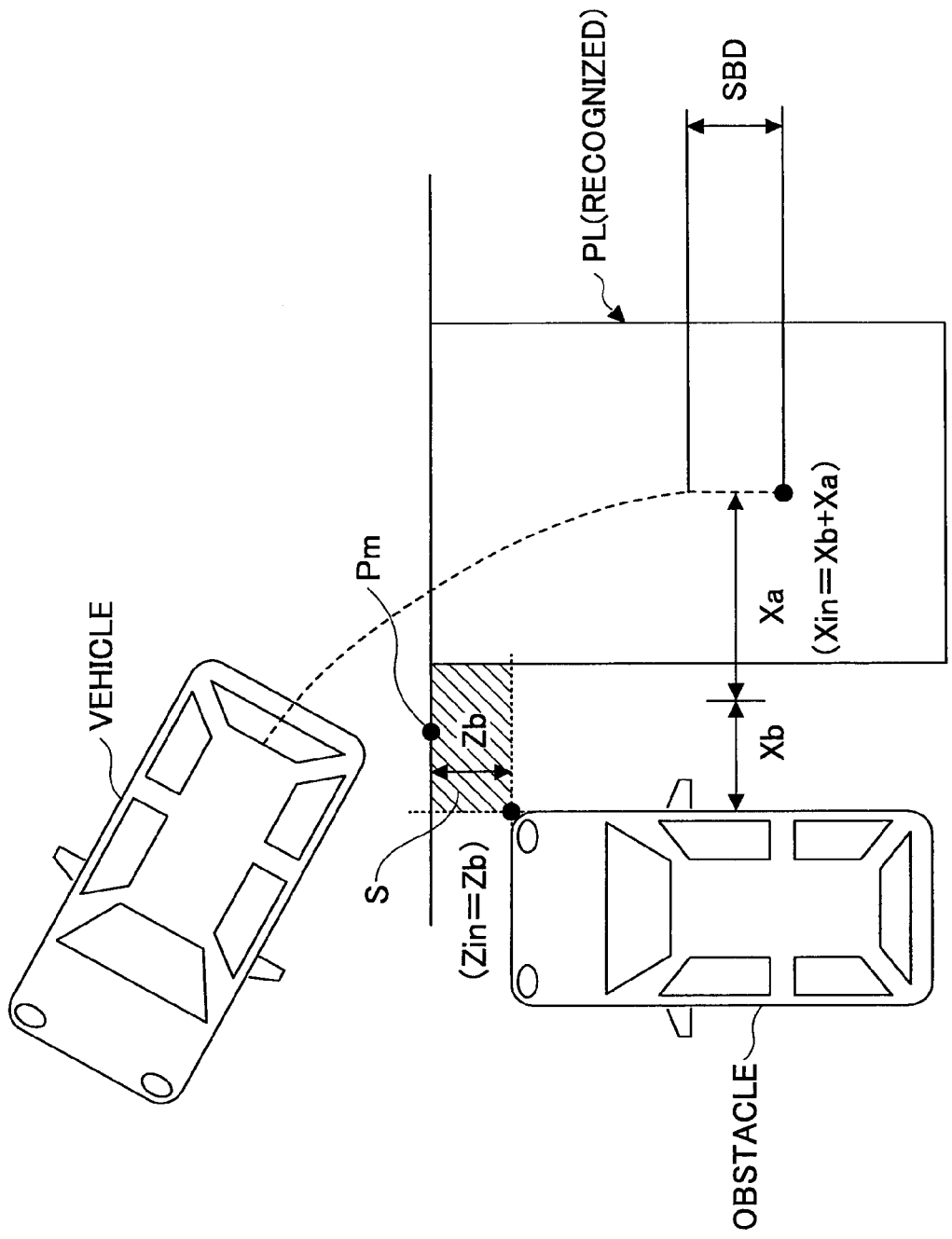
FIG. 9 is a plan view for illustrating the way of calculating the target track under the condition where there is an obstacle on a turn center side and the parking section line is detected by means of image recognition.

FIG. 9 is a plan view for illustrating a situation in which there is an obstacle on the turn center side and the parking section line is detected in front of the edge portion of the obstacle located on the turn center side by means of image recognition. It is noted that the term "front" indicates the inlet side of the parking space with respect to the back side of the parking space along the Z direction.

Under the situation shown in FIG. 9, the target track calculating section 48 determines the target track, based on the edge position information of the obstacle located on the turn center side and the parking section line information. By using the edge position information of the obstacle and the parking section line information, it is possible to grasp the positional relationship between the obstacle and the parking section line PL, that is to say, a space S between the obstacle and the parking section line PL, as shown in FIG. 9. The space S between the obstacle and the parking section line PL cannot be grasped by one of the edge position information of the obstacle and the parking section line information, and can be grasped only when these two items of information are used.

Here, for convenience of comparison, it is assumed that in the situation shown in FIG. 8 the parking section line cannot be detected even though the parking section line is located in front of the edge position of the obstacle located on the turn center side.

In the situation shown in FIG. 8, since the parking section line information is not obtained, there is no other choice but to assume that the parking section line is located at the imaginary position on the safest side with respect to the edge portion of the obstacle as shown in FIG. 8. As a result, the space S between the obstacle and the parking section line PL is assumed to be small (minimum). To the contrary, in the situation shown in FIG. 8, even though the positional relationship between the vehicle and the obstacle is the same as in the situation shown in FIG. 8, the space S between the obstacle and the parking section line PL can be set larger by Xb in the direction X and Zb in the direction Z, for example, as shown in FIG. 9, by grasping the positional relationship between the obstacle and the parking section line PL. Therefore, by using this increased space (Xb, Zb) as a space through which the vehicle can pass in determining the target track, it becomes possible to generate the target track whose final straight line length SBD is shorter than that of the target track generated in the situation shown in FIG. 8.

Figure 10:
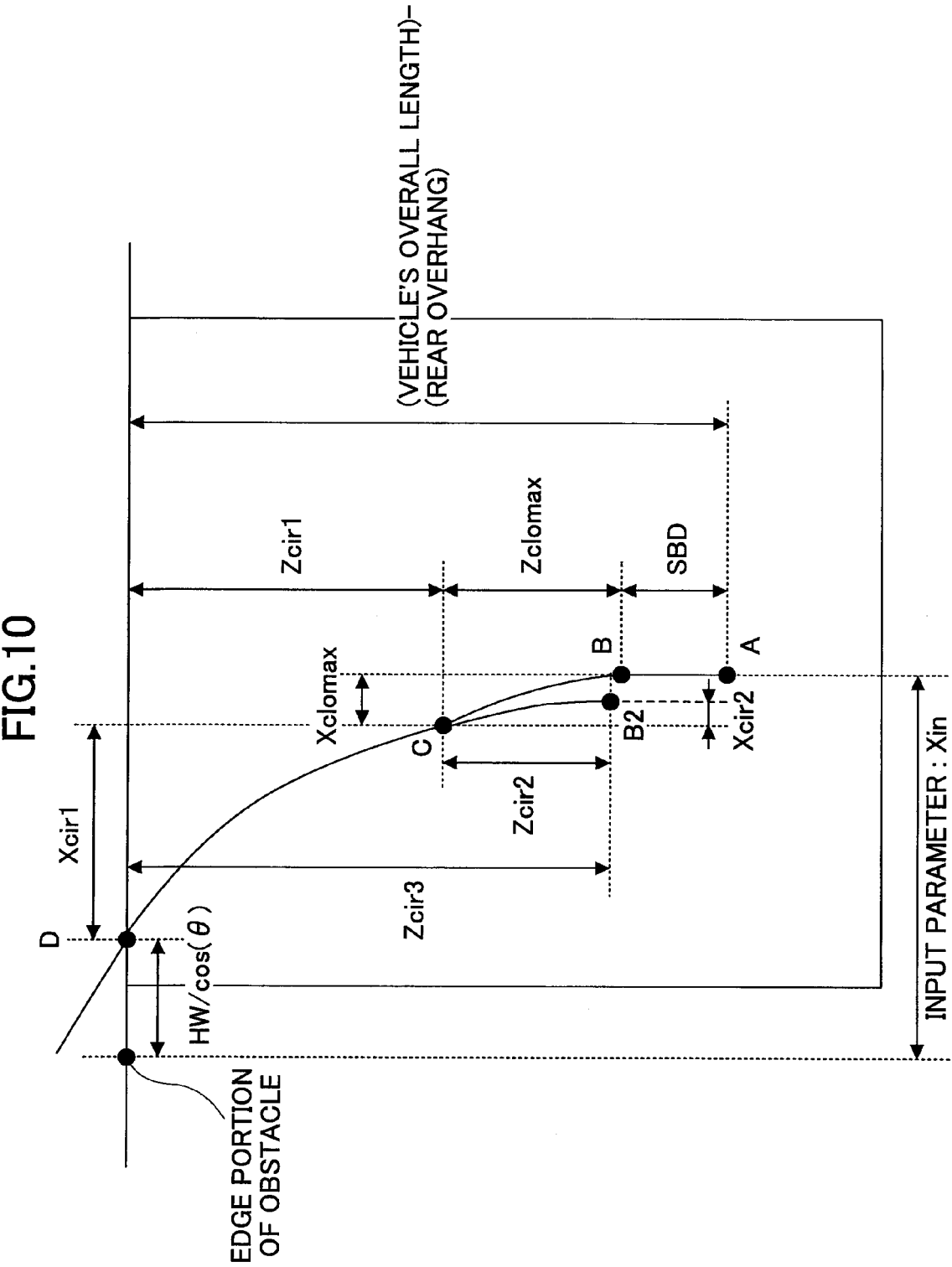
FIG. 10 is a diagram for illustrating an example of a way of calculating the final straight line length SBD.

FIG. 10 is a diagram for illustrating an example of a way of calculating the final straight line length SBD. In this example, input parameters to determine the final straight line length SBD are Xin and Zin, where Xin corresponds to a distance in the X direction between the edge position of the obstacle and the target parking position, and Zin corresponds to a distance in the Z direction between the edge position of the obstacle and the front line of the parking section line. Thus, Xin is equal to Xa and Zin is equal to 0 in the situation shown in FIG. 8, while Xin is equal to Xa+Xb and Zin is equal to Zb in the situation shown in FIG. 9.

The process of calculating the final straight line length SBD consists of a first step of determining a vehicle inclined angle $\theta$ at the point D, and a second step of determining the final straight line length SBD based on the vehicle inclined angle $\theta$. In the following, the process is described step by step, with reference to FIG. 10. FIG. 10 is a plan view for illustrating the target track of the vehicle toward the target parking position assumed when calculating the final straight line length SBD.

[First Step]

Point D is on a line which extends in the X direction and offsets forward from the target parking position by Za (=(vehicle's overall length)−(rear overhang)), and is shifted toward the target parking position from the obstacle by HW/cos($\theta$), as shown in FIG. 10. Section DC is assumed to be a circular section, and point B2 is on an extended line of the circular section DC at which the angle becomes zero. In this example, the approximation is performed using the point B2, instead of the end point B of the clothoid track at which the angle becomes 0.

Assuming that $\theta$clomax expresses the angle at the point C and $\gamma$max expresses the maximum cornering curvature of the vehicle, the distance Xcir2 in the X direction can be expressed as follows;

$$X\text{cir2} = (1 - \cos(\theta\text{clomax}))/\gamma\text{max}$$

Here, since the input parameter Xin can be expressed as follows, Xcir1 can be expressed as follows;

$$X\text{in} = HW/\cos(\theta) + X\text{cir1} + X\text{clomax}$$

$$X\text{cir1} = X\text{in} - X\text{clomax} - HW/\cos(\theta) \quad (1)$$

Further, with respect to section from B2 to D, the following equation can be established.

$$1 - \gamma\text{max}*(X\text{cir1} + X\text{cir2}) = \cos(\theta) \quad (2)$$

The following equation (3) can be derived from the equations (1) and (2).

$$\cos 2(\theta) - (1 - \gamma\text{max}*X\text{in} + \gamma\text{max}*X\text{clomax} - \gamma\text{max}*X\text{cir2})* \cos(\theta) - \gamma\text{max}*HW = 0 \quad (3)$$

Here, if solving the equation (3), assuming that $A = 1 - \gamma\text{max}*X\text{in} + \gamma\text{max}*X\text{clomax} - \gamma\text{max}*X\text{cir2}$, $\theta$ is expressed as follows;

$$\theta = \cos^{-1}((A + \text{sqrt}(A*A + 4*\gamma\text{max}*HW))/2)$$

[Second Step]

When the vehicle inclined angle $\theta$ at the point D is determined, the final straight line length SBD is determined as follows;

$$SBD = Za - (Z\text{cir3} - Z\text{cir2}) - Z\text{clomax} - Z\text{in} \quad (4)$$

Here, the following representation is used.

$$X\text{cir3} = \sin(\theta)/\gamma\text{max}$$

$$X\text{cir2} = \sin(\theta\text{clomax})/\gamma\text{max}$$

$$Za = (\text{vehicle's overall length}) - (\text{rear overhang})$$

The final straight line length SBD determined as such becomes smaller as Xin becomes greater and thus $\theta$ becomes smaller, and the final straight line length SBD determined as such becomes smaller as Zin becomes greater.

If the final straight line length SBD is determined in this way, then the target track is calculated based on the determined final straight line length SBD. In this case, since the magnitude of the determined final straight line length SBD has been adapted to avoid the obstacle as mentioned before, the part of the target track excluding the final straight line length SBD cannot be influenced by the obstacle and thus may be determined so as to implement the optimal steering efficiency mainly based on positional and angular relationship between the vehicle at the current position and the vehicle at the start point of the final straight line section, the cornering characteristics of the vehicle, etc.

Figure 11:
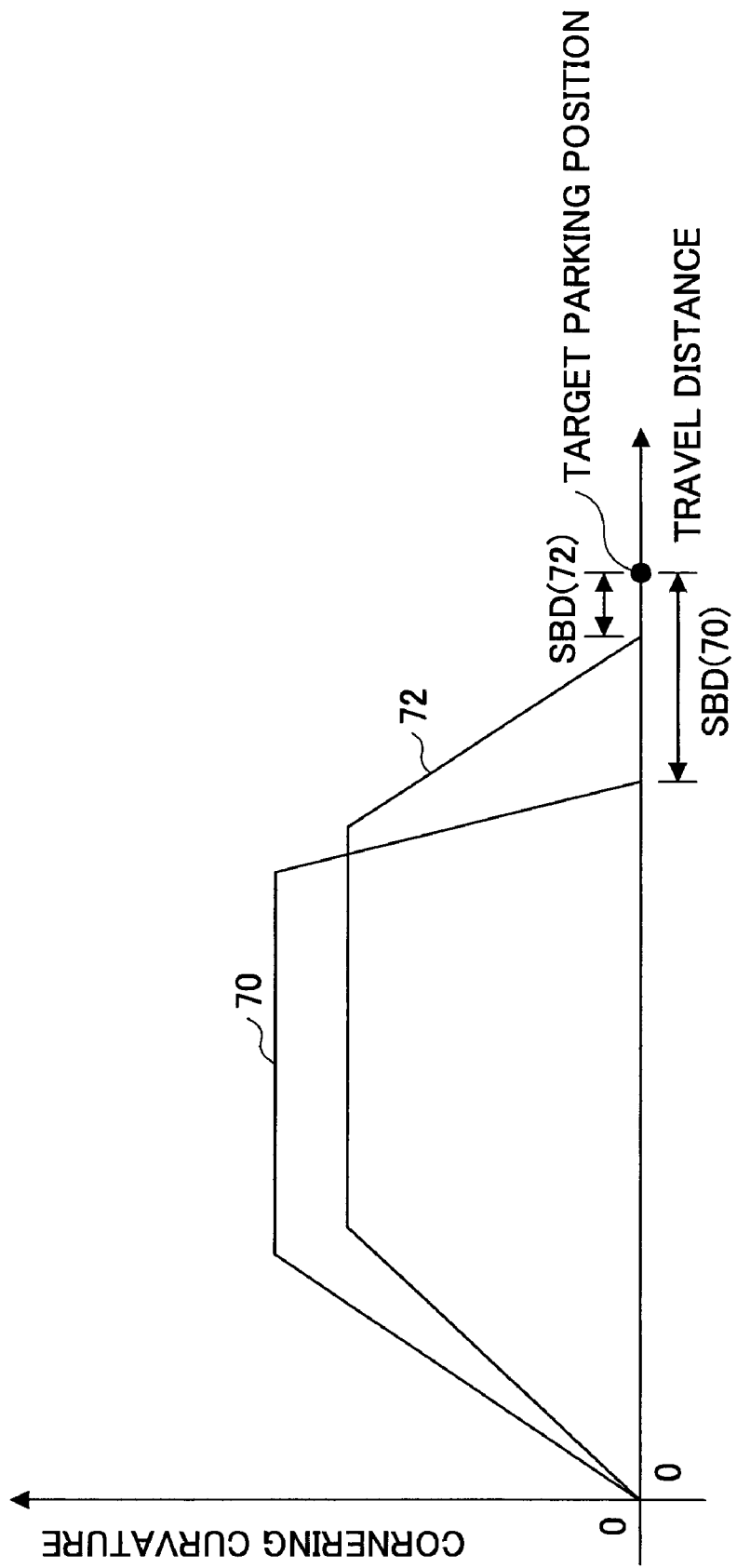
FIG. 11 is a diagram for illustrating relationships between a curvature and a travel distance when the vehicle moves in accordance to the respective target tracks.

FIG. 11 is a diagram for illustrating relationships between a curvature and a travel distance when the vehicle moves in accordance to the respective created target tracks. In FIG. 11, the curve 70 representing the relationship with respect to the target track created under the situation shown in FIG. 8, and the curve 72 representing the relationship with respect to the target track created under the situation shown in FIG. 9 are illustrated in a comparable manner. The respective target tracks are assumed to be created from the same parking start position to the same target parking position.

As shown In FIG. 11, under the situation shown in FIG. 8, since the relatively great final straight line length SBD is set, the curve 70 shows that the cornering curvature increases toward the maximum cornering curvature with a steep gradient after the vehicle starts to move, and decreases from the maximum cornering curvature with a steep gradient when the track of the vehicle transits to the straight track after the circle track. To the contrary, under the situation shown in FIG. 9, since the relatively small final straight line length SBD is available, the curve 72 shows that the cornering curvature increases toward the maximum cornering curvature with a gentle gradient (i.e., in a manner in which the steering efficiency improves) after the vehicle starts to move, and decreases from the maximum cornering curvature with a gentle gradient (i.e., in a manner in which the steering efficiency improves) when the track of the vehicle transits to the straight track after the circle track.

In this way, according to the present invention, it is possible to make effective use of the corner area which is located on an inlet side and within the neighboring parking section line PL, because of the positional relationship between the obstacle near the vehicle and the parking section line. Therefore, it becomes possible to actively use the space to create the target track, which enables creating the target track with a high degree of flexibility and high steering efficiency.

With a comparable configuration in which the target track is created using only the parking section line information (or the target parking frame with the pole image), the edge portion Pm of an imaginary obstacle is assumed to be located in a predetermined relationship with the parking section line (or the target parking frame), and the target track is created so as not to interfere with the edge portion Pm, as shown in FIG. 9. With such a configuration, it is not possible to create a target track which can avoid the edge portion Pm when the vehicle is in the vehicle position shown in FIG. 9. In this case, the driver is forced to change the parking start position or target parking position (or reset the process if starting the process of the parking), bringing inconvenience to the driver.

To the contrary, according to the present embodiment, since the positional relationship between the parking section line and the edge portion of the obstacle is recognized based on the position of the edge portion of the obstacle which is actually detected, it is possible to make effective use of the corner area (which could include the position at which the edge portion Pm of the imaginary obstacle is assumed to be located), which is located on an inlet side within the neighboring parking section line and on a turn center side, to create the target track. For this reason, the target track toward the target parking position can be created even when the vehicle is in the vehicle position shown in FIG. 9, and thus it becomes difficult for the parking assisting apparatus to fall into such a situation in which the target track cannot be created.

Figure 12:
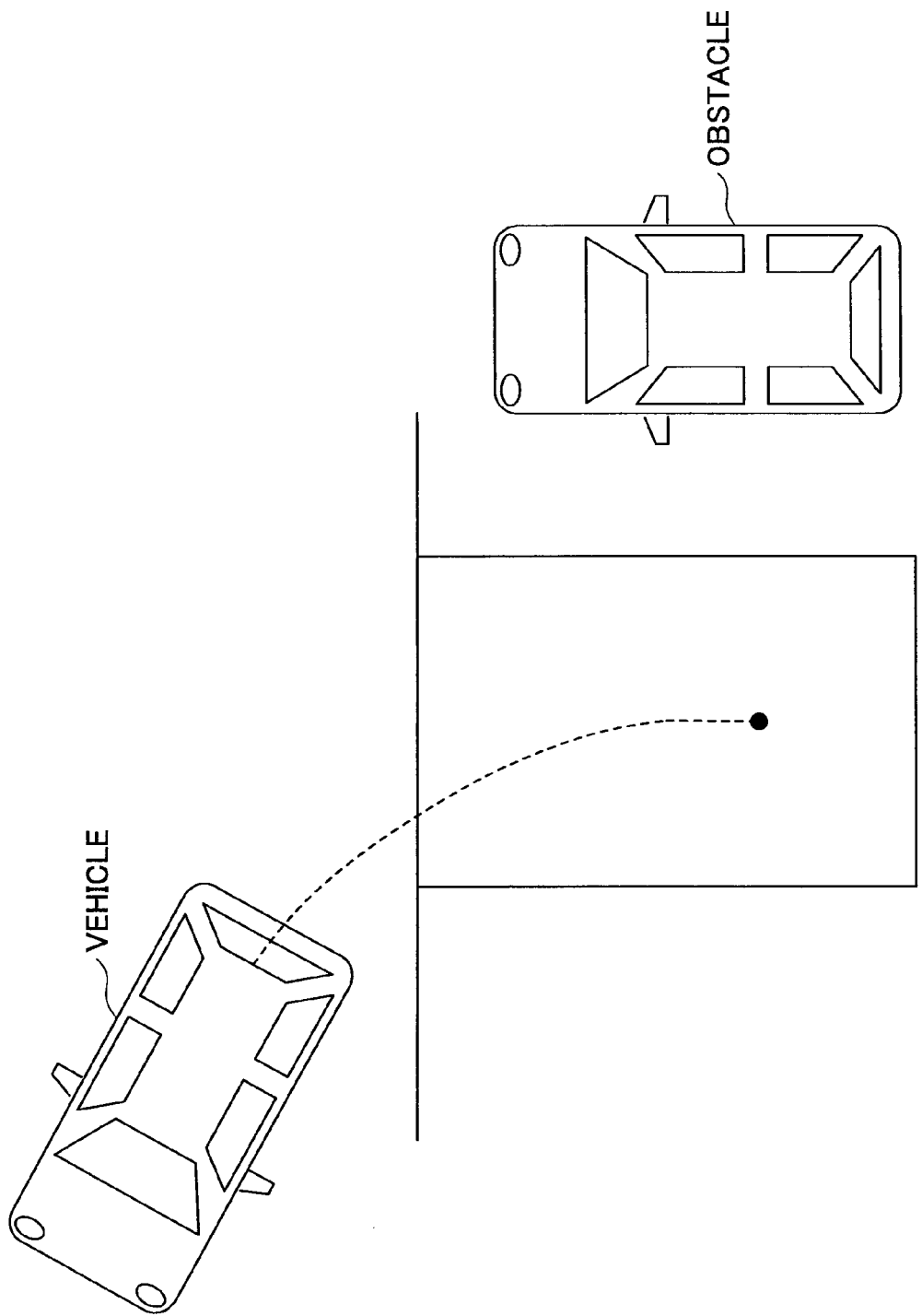
FIG. 12 is a plan view for illustrating the way of calculating the target track under the condition where there is no obstacle on a turn center side and the parking section line is detected by means of image recognition.

FIG. 12 is a plan view for illustrating a situation where there is no obstacle on a turn center side (in this example, there is an obstacle on a side opposite to the turn center side) and the parking section line is detected by means of image recognition.

The situation in which there is no obstacle on the turn center side may be detected based on the output results of the distance-measuring sensor 70. Alternatively, the situation may be detected based on image recognition results of the obstacle(s) using the images captured by the monitoring camera 20 or the side monitoring camera.

Under the situation shown in FIG. 12, the target track calculating section 48 freely use the space on the turn center side (i.e., the corner area on the inlet side within the neighboring parking section line) to determine the target track based on the parking section line information. This is because there is no obstacle within the neighboring parking section line and thus there is no need to avoid the edge portion of the obstacle. In this case, the final straight line length SBD becomes minimum, 0.5 m, for example. This value of the final straight line length SBD (0.5, for example) may be used as a lower limit in determining the final straight line length SBD. Of course, even in the situation shown in FIG. 9, the final straight line length SBD may become minimum if the input parameters (Xb, Zb) are sufficiently great (i.e., the input parameters are great enough to eliminate the necessity for considering the edge position of the obstacle).

Figure 13A:
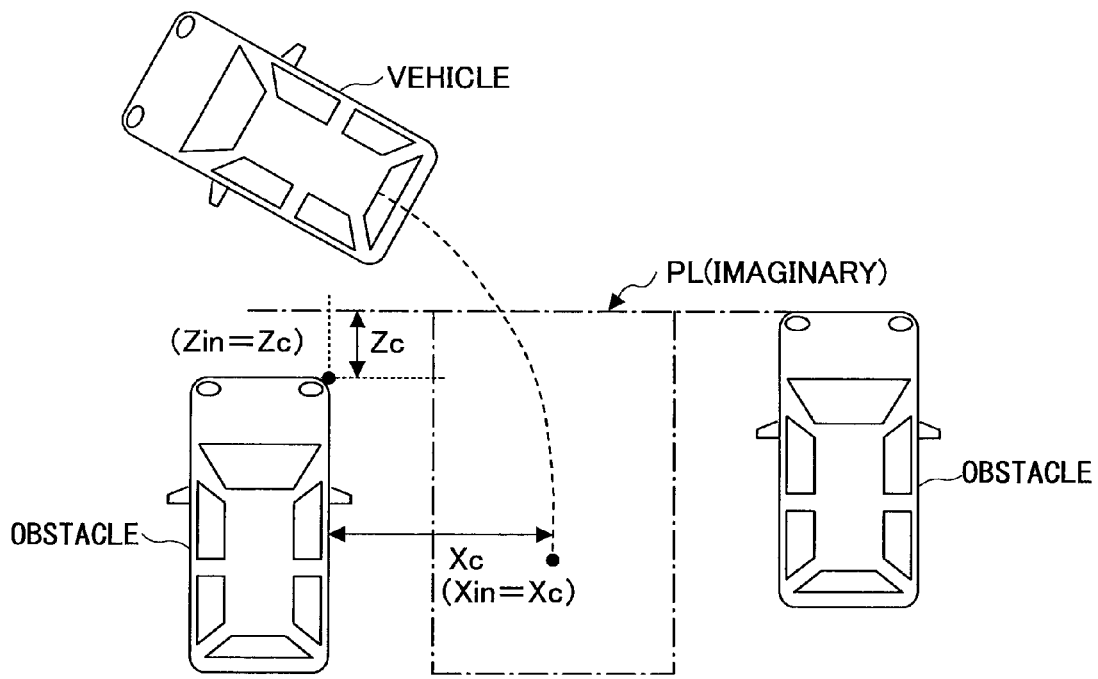
FIG. 13 is a plan view for illustrating the way of calculating the target track under the various conditions.
Figure 13B:
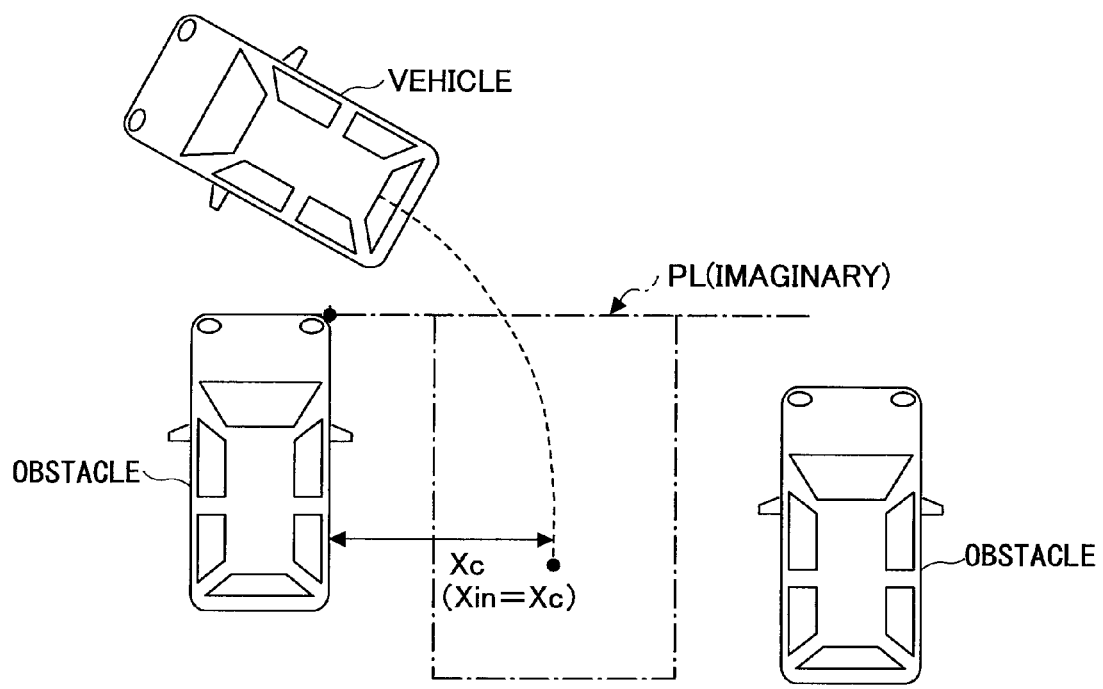

FIG. 13A is a plan view for illustrating a situation where there is an obstacle on each side of the parking space, the obstacle on the farther side (i.e., on the side opposite to the turn center side) juts out more than the other obstacle, and the parking section line is not detected by means of image recognition. FIG. 13B is a plan view for illustrating a situation where there is an obstacle on each side of the parking space, the obstacle on the near side (i.e., on the turn center side) juts out more than the other obstacle, and the parking section line is not detected by means of image recognition.

The situation in which there is an obstacle on each side of the parking space may be detected based on the output results of the distance-measuring sensor 70. Alternatively, the situation may be detected based on image recognition results of the obstacle(s) using the images captured by the monitoring camera 20 or the side monitoring camera. Similarly, the output results of the distance-measuring sensor 70 or image recognition results may be used to determine which obstacle juts out more. Here, to determine which obstacle juts out more, the positive direction corresponds to the forward direction of the vehicle if the obstacle is a vehicle, and the direction from the back side to the inlet side of the parking space in the Z direction.

As previously described, the situation in which the parking section line in the image is not recognized may be a situation in which the parking section line cannot be recognized due to the positional relationship between the actual parking section line and the coverage of the back monitoring camera 20, a situation in which no parking section line exist in the first place, a situation in which the back monitoring camera 20 itself or a function of recognizing the parking section line in the image is not available in the first place, etc. Although the parking section line PL is indicated by alternate long and short dashed lines in FIG. 13, this parking section line PL is an imaginary parking section line imagined by the system (i.e., parking assisting ECU 12).

Under the situations shown in FIGS. 13A and 13B, the target track calculating section 48 assumes an imaginary parking section line PL in a predetermined relationship with the edge position of the obstacle which juts out more than the other obstacle, and determines the target track based on the positional information of the imaginary parking section line PL and the positional information of the portion of the obstacle on the turn center side. Thus, if the obstacle on the side opposite to the turn center side juts out more than the other obstacle as shown in FIG. 13A, the space near the edge portion of the obstacle on the turn center side (i.e., the space related to the magnitude of Zc) can be utilized more efficiently to create the target track, in comparison with the case where the obstacle on the turn center side juts out more than the other obstacle as shown in FIG. 13B. It is noted that if the obstacle on the turn center side juts out more than the other obstacle as shown in FIG. 13B, the target track is determined in the same manner as the case with the situation shown in FIG. 8.

Specifically, under the situation shown in FIG. 13A, the final straight line length SBD is determined by setting input parameters as Xin=Xc and Zin=Zc, and then the target track which includes the determined final straight line length SBD is determined. On the other hand, under the situation shown in FIG. 13B, the final straight line length SBD is determined by setting input parameters as Xin=Xc and Zin=0, and then the target track which includes the determined final straight line length SBD is determined. Thus, the target track created in the situation shown in FIG. 13A has a smaller final straight line length SBD and a greater curvature radius in the turning track near the edge portion of the obstacle because of Zc, in comparison with the target track created in the situation shown in FIG. 13B.

It is noted that since the present embodiment is configured such that the position of the imaginary parking section line PL in X direction is determined depending on the target parking position in X direction (for example, the midpoint between two obstacles), there is no substantial difference in available space in the X direction between the situations shown in FIGS. 13A and 13B. However, with the configuration in which when the obstacle on the side opposite to the turn center side juts out more than the other obstacle the target parking position is determined to be in a predetermined relationship with the edge portion of the jutting obstacle, the space near the edge portion of the obstacle on the turn center side becomes larger in the X direction, as the distance between two vehicles in the X direction becomes larger. In this case, the space in the X direction near the edge portion of the obstacle on the turn center side also can be utilized more efficiently to create the target track, in comparison with the case where the target parking position is determined to be in a predetermined relationship with the edge portion of the obstacle on the turn center side.

Figure 14A:
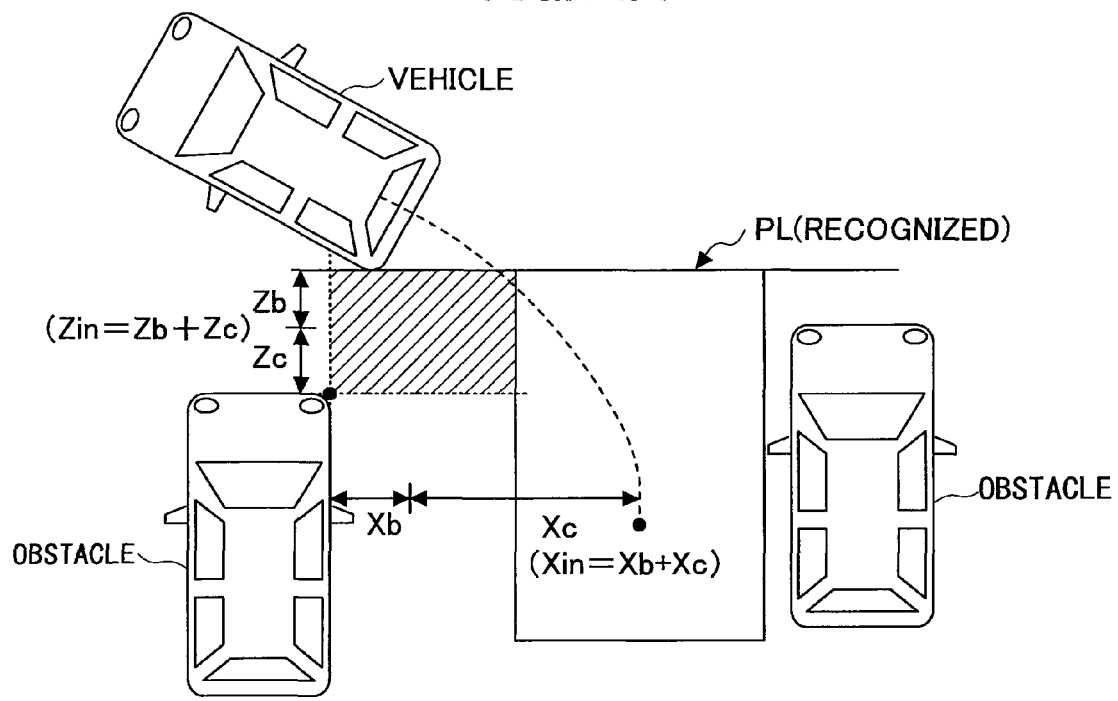
FIG. 14 is a plan view for illustrating the way of calculating the target track under the various conditions.

FIG. 14A is a plan view for illustrating a situation where there is an obstacle on each side of the parking space, the obstacle on the farther side (i.e., on the side opposite to the turn center side) juts out more than the other obstacle, and the parking section line is detected on a front side with respect to the edge position of the obstacle on the turn center side by means of image recognition.

Figure 14B:
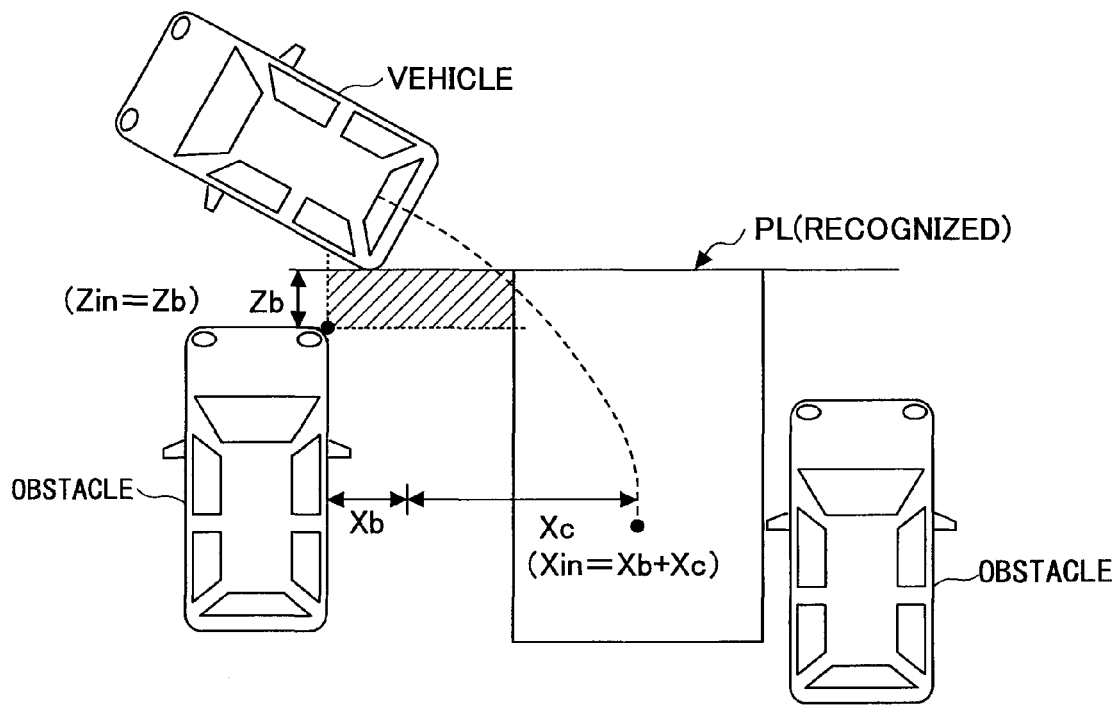

FIG. 14B is a plan view for illustrating a situation where there is an obstacle on each side of the parking space, the obstacle on the near side (i.e., on the turn center side) juts out more than the other obstacle, and the parking section line is detected on a front side with respect to the edge position of the obstacle on the turn center side by means of image recognition.

Under the situation shown in FIG. 14A, the target track calculating section 48 determines the target track, based on the positional information of the edge portion of the obstacle located on the turn center side and the parking section line information. The way of creating the target track may be the same as the way described with reference to FIG. 9.

Here, for convenience of comparison, it is assumed that in the situation shown in FIG. 13A the parking section line cannot be detected even though the parking section line is located on a front side with respect to the edge position of the obstacle on the turn center side.

In the situation shown in FIG. 13A, since the parking section line information is not obtained, there is no other choice but to assume that the parking section line is located in a predetermined relationship with the edge portion of the obstacle as shown in FIG. 13A. As a result, the space S between the obstacle and the parking section line PL is assumed to be small. To the contrary, in the situation shown in FIG. 14A, even though the positional relationship between the vehicle and the obstacle is the same as in the situation shown in FIG. 13A, the space S between the obstacle and the parking section line PL can be set larger by Xb in the direction X and Zb in the direction Z, for example, in accordance with the positional relationship between the obstacle and the parking section line PL, as shown in FIG. 14A. Therefore, by using this increased space as a space through which the vehicle can pass in determining the target track, it becomes possible to generate the target track whose final straight line length SBD is shorter than that of the target track generated in the situation shown in FIG. 13A.

Specifically, under the situation shown in FIG. 14A, the final straight line length SBD is determined by setting input parameters as Xin=Xc+Xb and Zin=Zc+Zb, and then the target track which includes the determined final straight line length SBD is determined. Thus, the target track created in the situation shown in FIG. 14A has a smaller final straight line length SBD and a greater curvature radius in the turning track near the edge portion of the obstacle, in comparison with the target track created in the situation shown in FIG. 13A.

Under the situation shown in FIG. 14B, the target track calculating section 48 determines the target track, based on the positional information of the edge portion of the obstacle located on the turn center side and the parking section line information. The way of creating the target track may be the same as the way described with reference to FIG. 9 and FIG. 14A.

Here, for convenience of comparison, it is assumed that in the situation shown in FIG. 13B the parking section line cannot be detected even though the parking section line is located on a front side with respect to the edge position of the obstacle on the turn center side.

In the situation shown in FIG. 14B, even though the positional relationship between the vehicle and the obstacle is the same as in the situation shown in FIG. 13B, the space S between the obstacle and the parking section line PL can be set larger by Xb in the direction X and Zb in the direction Z, for example, in accordance with the positional relationship between the obstacle and the parking section line PL, as shown in FIG. 14B. Therefore, by using this increased space as a space through which the vehicle can pass in determining the target track, it becomes possible to generate the target track whose final straight line length SBD is shorter than that of the target track generated in the situation shown in FIG. 13B.

Specifically, under the situation shown in FIG. 14B, the final straight line length SBD is determined by setting input parameters as Xin=Xc+Xb and Zin=Zb, and then the target track which includes the determined final straight line length SBD is determined. Thus, the target track created in the situation shown in FIG. 14B has a smaller final straight line length SBD and a greater curvature radius in the turning track near the edge portion of the obstacle, in comparison with the target track created in the situation shown in FIG. 13B.

In this way, according to the present invention, it is possible to set an optimum target track (including an optimum final straight line length SBD) in accordance with image recognition results of the parking section line and detection results of the obstacle(s) near the parking space. Thus, it is possible to create the target track with high steering efficiency by shortening the final straight line length SBD, which improves convenience of the parking assist. Furthermore, the target track which can be changed or modified flexibly can be created by utilizing the space, which was not used conventionally, as a space through which the vehicle can pass. In other words, even if the position where the driver stops the vehicle departs from the optimum parking start position, or the target parking position has been changed after having reached the parking start position, the target track adapted for such situations could be created, which makes it difficult for the parking assisting apparatus to fall into such a situation in which the target track cannot be created. Furthermore, since the distance from the parking start position to the target parking position becomes shorter by shortening final straight line length SBD, the parking start position can be similar to the ordinary parking start position in the case of not utilizing the parking assist, which improves the convenience of the parking assist. Furthermore, since the range of the parking start position from which the parking assist can be performed is broadened by utilizing the space, which is not used conventionally, as a space through which the vehicle can pass, the assist for guiding the vehicle to the parking start position can be performed with high flexibility.

It is noted that the present embodiment is suited when the distance from the parking start position to the target parking position is relatively short, in particular, as is apparent from the foregoing. This is because the orientation or the position of the vehicle can easily be changed optimally until the vehicle comes in proximity to the obstacle if the distance from the parking start position to the target parking position is sufficiently long. However, it is also possible to create a more efficient target track by making use of the present embodiment, even if the distance from the parking start position to the target parking position is sufficiently long.

Here, the target track determined as described above may be used at any stage in the course of guiding the vehicle to the target parking position. Although the target track is typically used in the course of guiding the vehicle from the parking start position to the target parking position, the target track may be used at the pre-parking stage (guiding stage for parking start position) in which the vehicle is be guided to the parking start position.

In the former case (i.e., the case where the target track is used while the vehicle rolls backward), the parking assisting ECU 12 may perform the parking assist while the vehicle rolls backward, using the target track determined as described above just as it is. Specifically, as shown in FIG. 1, the parking assisting ECU 12 estimates the position of the vehicle using the travel distance of the vehicle derived from the output signals of the vehicle speed sensor 18 and the steering position derived from the output signals of the steering angle sensor 16. Then, the parking assisting ECU 12 calculates a target steering angle as a function of the amount of departure of the estimated vehicle position from the target track. The parking assisting ECU 12 transmits the calculated target steering angle to the steering system ECU 30. The steering system ECU 30 controls the motor (steering actuator) 32 so as to implement the target steering angle. The motor 32 may be disposed in a steering column for rotating a steering shaft by its rotating angle. In this case, the target track may be recalculated whenever necessary in accordance with the target parking position which is corrected whenever necessary based on the image captured by the back monitoring camera 20 while the vehicle rolls backward.

In the latter case (i.e., the case where the target track is used in guiding the vehicle to the parking start position), the target track calculating section 48 may determine the parking start position from which the parking assist while the vehicle rolls backward can be performed using the target track determined as described above. If the target track determined as described above is used only to guide to the parking start position, that is to say, the target track is renewed after the parking start position and the target parking position are confirmed finally, the part of the target track excluding the final straight line length SBD may be calculated approximately using the maximum cornering curvature of the vehicle, etc.

The present invention is disclosed with reference to the preferred embodiments. However, it should be understood that the present invention is not limited to the above-described embodiments, and variations and modifications may be made without departing from the scope of the present invention.

For example, in the above-described embodiments, the final straight line length SBD is determined using two parameters Xin and Zin so as to make effective use of the space not only in the Z direction but also in the X direction in the corner area on the inlet side within the neighboring parking section line. However, the final straight line length SBD may be determined using any one of the two parameters Xin and Zin. For example, in a simplified embodiment, the final straight line length SBD may be determined by subtracting the input parameter Zc from the final straight line length SBD (i.e., reference SBD) which is set under the situation shown in FIG. 8.

Further, in the above-described embodiments, a particular way of calculating the final straight line length SBD is described by way of illustration, but the present invention is not limited to such a particular way. Any other calculating way can be used as long as the calculated final straight line length SBD varies depending on the positional relationship between the parking section line and the obstacle.

Further, in the above-described embodiments, the configuration is employed in which the steering operation while the vehicle rolls backward to the final target parking position is performed automatically using the steering actuator, and the clothoid section and the lower limit of the final straight line length SBD are set because of the fact that the stationary steering operation cannot be performed even with the latest steering actuator. However, in the configuration in which the steering operation is performed manually, the configuration in which only the stationary steering operation is performed manually, it is also possible to shorten the length of the clothoid section or set the lower limit of the final straight line length SBD to be substantially zero.

Further, in the above-described embodiments, if the obstacle is detected on either side of the parking space, the target parking position in the X direction (and thus the input parameter Xc) is determined to correspond to the midpoint between two obstacles. However, the target parking position in the X direction may be determined based on the obstacle on the turn center side, as is the case shown in FIG. 8. In this case, under the situations shown in FIGS. 13A and 13B, for example, the input parameter Xc may be replaced with Xa.

Further, although in the above-described embodiments the information as to the orientation and the position of the vehicle is obtained and derived from the vehicle speed sensor 18 and the steering angle sensor 16, the detection results of a yaw rate sensor, a gyroscopic sensor, a declinometer, a GPS sensor, etc., may be used in addition to them or instead of them.

Further, although in the above-described embodiments the obstacle is assumed to be a vehicle for the purpose of convenience of explanation, the obstacle may include any tangible goods such as a bicycle, a motorbike, walls, more than two pylons, etc.

The present application is based on Japanese Priority Application No. 2006-120976, filed on Apr. 25, 2006, the entire contents of which are hereby incorporated herein by reference.

The invention claimed is:

1. A parking assisting apparatus for assisting parking a vehicle in a target parking position, comprising;
    a calculating part configured to calculate, based on a detection result of an obstacle near the vehicle and a result of image recognition of a parking section line painted on a ground, an area between said obstacle and the parking section line,
    wherein said apparatus is configured to vary a target track of the vehicle toward the target parking position based on a result of the calculation of the area between the obstacle and the parking section line.

2. The parking assisting apparatus as claimed in claim 1, wherein the target track is varied in its turning radius and its length of a straight line section after a turning section.

3. The parking assisting apparatus as claimed in claim 1, wherein said apparatus is configured to calculate the target track of the vehicle toward the target parking position based on positional information of the obstacle which is located on a turn center side if the parking section line is not detected.

4. The parking assisting apparatus as claimed in claim 1 or 2, wherein if a parking space is detected between two obstacles and the parking section line is not detected, said apparatus is configured to calculate the target track of the vehicle toward the target parking position based on positional information of the obstacle which juts out more than the other obstacle on an inlet side of the parking space.

5. A parking assisting apparatus for assisting parking a vehicle in a target parking position, comprising;

a calculating part configured to calculate, based on a detection result of a first obstacle and a second obstacle near the vehicle, a positional relationship between the first obstacle and the second obstacle, wherein if a parking space is detected between the first obstacle and the second obstacle, said apparatus is configured to vary a target track of the vehicle toward a target parking position based on a result of the calculation of the positional relationship between the first obstacle and the second obstacle in a parking direction; and wherein the target parking position has a parallel parking orientation such that a front end of the vehicle faces the first obstacle and a rear end of the vehicle faces the second obstacle when the vehicle is positioned in the target parking position.

6. The parking assisting apparatus as claimed in claim 5, wherein in a situation where one of the first obstacle or the second obstacle which is located not on a turn center side juts out more than the other of the first obstacle or the second obstacle on an inlet side of the parking space, the target track is calculated such that the turning radius in the case of the amount of jutting out being larger is larger than that in the case of the amount of jutting out being smaller and/or the length of the straight line portion section after the turning section in the case of the amount of jutting out being larger is smaller than that in the case of the amount of jutting out being smaller.

7. A parking assisting method of assisting parking a vehicle, comprising;
- a step of calculating, based on a detection result of an obstacle near the vehicle and a result of image recognition of a parking section line painted on a ground, an area between said obstacle and the parking section line;
- a step of determining a target parking position; and
- a step of varying a target track of the vehicle toward the determined target parking position based on a result of the calculation of the area between the obstacle near the vehicle and the parking section line painted on the ground.

* * * * *